United States Patent [19]

Shibayama et al.

[11] Patent Number: 5,483,823
[45] Date of Patent: Jan. 16, 1996

[54] METHOD AND APPARATUS FOR INSPECTING VARIOUS RUNNING CONTROL FUNCTIONS OF A MOTORCAR

[75] Inventors: Takao Shibayama; Keiichiro Maekawa; Kimitake Uzuyama; Masaru Maruo; Akihito Fukutome; Yoshiharu Nakazono; Yoshimichi Matsumoto, all of Sayama, Japan

[73] Assignee: Honda Giken Kogyo Kabushiki Kaisha, Tokyo, Japan

[21] Appl. No.: 356,916

[22] Filed: Dec. 15, 1994

Related U.S. Application Data

[62] Division of Ser. No. 1,291, Jan. 6, 1993, Pat. No. 5,402,676.

[30] Foreign Application Priority Data

Feb. 28, 1992 [JP] Japan ..................... 4-043996
Feb. 29, 1992 [JP] Japan ..................... 4-44163
Oct. 26, 1992 [JP] Japan ..................... 4-287932

[51] Int. Cl.$^6$ .................................. G01M 15/00
[52] U.S. Cl. ........................................ 73/118.1
[58] Field of Search ..................... 73/117, 117.1, 73/118.1

[56] References Cited

U.S. PATENT DOCUMENTS 4,848,142  7/1989  Fujimori et al. .
5,058,423 10/1991  Ozaki et al. ................. 73/117

FOREIGN PATENT DOCUMENTS 0280343  8/1988  European Pat. Off. .
63-84544  6/1988  Japan .
1-182128  7/1989  Japan .
1-214731  8/1989  Japan .
1-191031  8/1989  Japan .
1-233124  9/1989  Japan .
3-42544   2/1991  Japan .
2211312   6/1989  United Kingdom .

*Primary Examiner*—Robert Raevis
*Attorney, Agent, or Firm*—Armstrong, Westerman, Hattori, McLeland & Naughton

[57] ABSTRACT

A running control function of a motorcar is inspected on an inspecting apparatus which is provided with rolls for mounting thereon each of wheels of the motorcar. The control function operates to control rotational speeds of wheels depending on a difference in rotational speed between front and rear wheels or right and left wheels of the motorcar. The motorcar is caused to run in a condition in which each of the wheels of the motorcar is mounted on each of the rolls. When a rotational speed of a first roll for mounting thereon one of front and rear wheels or one of right and left wheels and a rotational speed of a second roll for mounting thereon the other of the front and rear wheels or the other of the right and left wheels have both increased to a predetermined speed, the first roll is decelerated. A judgement is made as to whether the running control function is acceptable or not based on a correlation between a change in rotational speed of the first roll and a change in rotational speed of the second roll during the step of deceleration.

3 Claims, 5 Drawing Sheets

METHOD AND APPARATUS FOR INSPECTING VARIOUS RUNNING CONTROL FUNCTIONS OF A MOTORCAR

This is a division of application Ser. No. 08/001,291 filed Jan. 6, 1993, now U.S. Pat. No. 5,402,676.

BACKGROUND OF THE INVENTION

The present invention relates to a method of inspecting various running control functions of a motorcar, such as a traction control system and a limited slip differential mechanism and the like, which function to control the rotation of wheels according to the difference in rotational speed between the front and rear wheels or between the right and left wheels of the motorcar, and also relates to an apparatus to be used in carrying out the method.

The traction control system functions to operate in the following manner. Namely, a ratio of slippage is calculated based on the difference in rotational speed between driven wheels which correspond to one of the front and rear wheels and driving wheels which correspond to the other of the front and rear wheels. The rotation of the driving wheels is then controlled to keep the ratio of slippage within a predetermined range. As this kind of method of inspecting the traction control system, there is conventionally known a method in Japanese Published Unexamined Utility Model Registration Application No. 84544/1988. In this method, each of the wheels of a motorcar is mounted on each of rolls of an inspecting apparatus and an accelerator pedal is depressed in such a condition that each of the rolls is made to be freely rotatable. A judgement is thereby made whether the traction control system is acceptable or not based on the increase in the rotational speed of the rolls for the driving wheels within a predetermined time.

In the above-described Application No. 84544/1988, there is also described a method in which the accelerator pedal is depressed in a condition in which one roll for one of the right and left driving wheels is braked and in which a judgement is then made whether the limited slip differential mechanism is acceptable or not based on the value of increase in the rotational speed of the other roll for the other of the driving wheels within a predetermined time.

The above-described method of inspecting the traction control system has been made taking note of the following fact. Namely, at the time when the accelerator pedal is depressed, there occurs a difference in rotational speed between the driving wheels and the driven wheels (which will not rotate). If the traction control system operates normally, the increase in the rotational speed of the driving wheels is restrained and, consequently, the value of increase in the rotational speed of the rolls for the driving wheels within a predetermined time falls below a predetermined value. The same applies to the inspection of the limited slip differential mechanism.

However, even in case the traction control system and the limited slip differential mechanism do not function normally, there is sometimes a case where the value of increase in the rotational speed of the rolls within the predetermined time falls below the predetermined value, depending on the degree of depressing the accelerator pedal. It follows that the result of the inspection in such a case is judged to be acceptable in the above-described method of inspection. This brings about an inaccurate judgement.

SUMMARY AND OBJECT OF THE INVENTION

Taking the above disadvantage into consideration, the present invention has an object of improving the accuracy of inspection of various running control functions of a motorcar, such as a traction control system, a limited slip differential mechanism and the like.

In order to attain the above and other objects, the represent invention is characterized by a method of inspecting a running control function of a motorcar on an inspecting apparatus which is provided with rolls for mounting thereon each of wheels of the motorcar. The control function operates to control rotational speeds of wheels depending on a difference in rotational speed between front and rear wheels or right and left wheels of the motorcar. The method comprises the steps of: running the motorcar in a condition in which each of the wheels of the motorcar is mounted on each of the rolls; when a rotational speed of a first roll for mounting thereon one of front and rear wheels or one of right and left wheels and a rotational speed of a second roll for mounting thereon the other of the front and rear wheels or the other of the right and left wheels have both increased to a predetermined speed, decelerating the first roll; and judging whether the driving control function is acceptable or not based on a correlation between a change in rotational speed of the first roll and a change in rotational speed of the second roll during the preceding step of deceleration.

In another aspect of the present invention, there is provided a method of inspecting such a steering-interrelated control function of a motorcar as operates to control a rotation of at least one wheel in response to a steering operation of the motorcar. The method comprises the steps of: running the motorcar in a condition in which each of the wheels of the motorcar is mounted on each of rolls provided in an inspecting apparatus; simulating steering wheel operating conditions during the preceding step of running; detecting a change in rotational speed of a roll for mounting thereon a controlled wheel or a pair of controlled wheels which is/are subject to the control of the steering-interrelated control function and a change in rotational speed of a roll for mounting thereon the other wheel or the other pair of wheels which is/are counterpart/counterparts and which is/are not subject to the control of the steering-interrelated function; and judging whether the steering-interrelated control function is acceptable or not based on a correlation of the changes in rotational speed of both of the rolls.

In still another aspect of the present invention, there is provided an apparatus for inspecting such a running control function of a motorcar as operates to control a rotation of wheels depending on a difference in rotational speed between front and rear wheels or right and left wheels. The apparatus has rolls for mounting thereon respective wheels of the motorcar to carry out an inspection of the running control function by running the motorcar in a condition in which each of the wheels is mounted on each of said rolls. The apparatus comprises: first detecting means for detecting a rotational speed of a first roll for mounting thereon one of the front and rear wheels or one of the right and left wheels; second detecting means for detecting a rotational speed of a second roll for mounting thereon the other of the front and rear wheels or the other of the right and left wheels; changeover means for changing over between a condition in which the first and second rolls are synchronously rotated and a condition in which the first roll is decelerated relative to the second roll; and judging means for judging whether the driving control function is acceptable or not based on a correlation between a change in rotational speed of the first roll and a change in rotational speed of the second roll when the first roll is decelerated.

Preferably, when the inspection of a limited slip differential mechanism for restricting the difference in rotational speed between the right and left wheels as the driving wheels is carried out, braking means serving as the changeover means such as a brake, dynamometer or the like is provided for applying a braking force to the first roll for mounting thereon one of the right and left wheels. The first roll is thus decelerated by operating the braking means in a condition in which the second roll for mounting thereon the other of the right and left wheels is rotatable independent of the first roll.

In a preferred mode, when the inspection is made of the control function, e.g., traction control, which carries out a control according to the difference in rotational speeds of the driven wheels which correspond to one of the front and rear wheels and the driving wheels which correspond to the other of the front and rear wheels, the following arrangement is possible. Namely, a clutch serving as the changeover means is interposed in a connecting passage between the first roll for mounting thereon the driven wheels and the second roll for mounting thereon the driving wheels. Until the first roll is decelerated, the clutch is kept engaged to synchronously rotate the first and second rolls, and then the clutch is disengaged to naturally decelerate the first roll. It is also possible to add braking means in addition to the clutch to forcibly decelerate the first roll by means of the braking means.

In another preferred mode, it is also possible to interpose a viscous coupling in a connecting passage between the first roll for mounting thereon the driven wheels and the second roll for mounting thereon the driving wheels. Thus, when the braking force is applied to the first roll by braking means, a difference in rotational speed may be generated between the first roll and the second roll by the slippage of the viscous coupling. In this case, the changeover means comprises the clutch and the braking means.

By decelerating the first roll, there is generated a difference in rotational speed between the first roll and the second roll, in other words, between the wheels mounted on both rolls. By the operation of the running control function, the rotation of the wheels mounted on the second roll is controlled, and the rotational speed of the second roll varies with a predetermined correlation according to the change in rotational speed of the first roll. In the present invention, because a judgement as to whether the running control function is acceptable or not is made by checking the correlation between the change in the rotational speed of the first roll and the change in the rotational speed of the second roll, a correct judgement can be made of the running control function even if the degree of depressing the accelerator pedal varies from inspection to inspection or even if the degree of deceleration of the first roll fluctuates.

BRIEF DESCRIPTION OF THE DRAWINGS

The above and other objects and the attendant advantages of the present invention will become readily apparent by reference to the following detailed description when considered in conjunction with the accompanied drawings wherein.

DETAILED DESCRIPTION OF PREFERRED EMBODIMENTS

Figure 1:
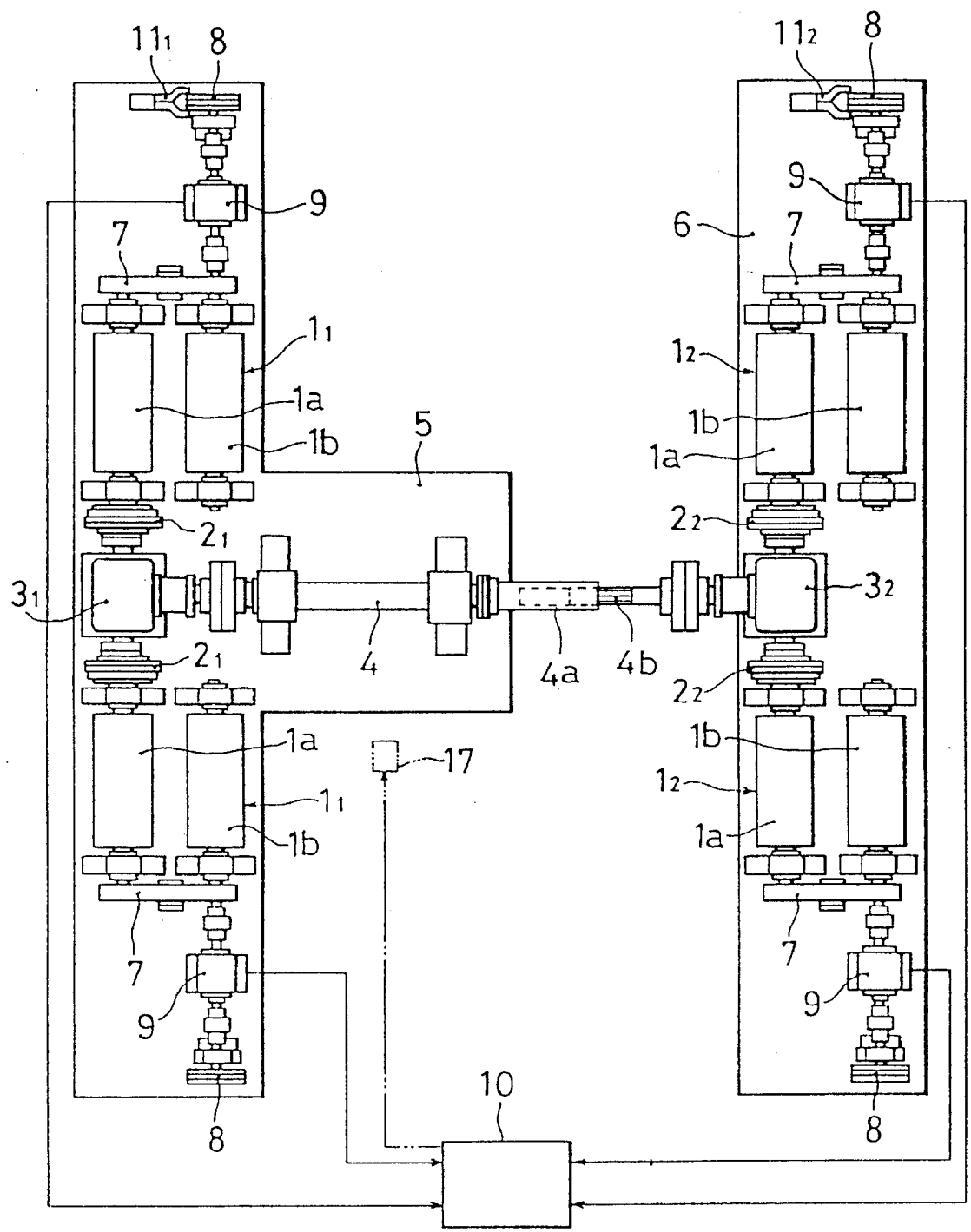
FIG. 1 is a plan view of a first embodiment of the inspecting apparatus according to the present invention.

FIG. 1 shows an inspecting apparatus for carrying out inspections of various running control functions such as a traction control system, limited slip differential mechanism, and the like of a motorcar. The apparatus is provided with a pair of right and left rolls $1_1$, $1_1$ for the front wheels of the motorcar and a pair of right and left rolls $1_2$, $1_2$ for the rear wheels of the motorcar. There are provided a gear box $3_1$ which connects the rolls $1_1$, $1_1$ via a clutch $2_1$ which is respectively disposed between the gear box $3_1$ and the right and left rolls $1_1$, $1_1$, and a gear box $3_2$ which connects the rolls 12, 12 via a clutch $2_2$ which is respectively disposed between the gear box $3_2$ and the right and left rolls $1_2$, $1_2$. Both of these gear boxes $3_1$, $3_2$ are connected together by a connecting shaft 4. It is thus so arranged that, when the motorcar is caused to run with its wheels mounted on the above-described respective rolls, the rear wheels as the driven wheels, in the case of a front-wheeldrive motorcar, are caused to be rotated via rolls $1_1$, clutches $2_1$, gear box $3_1$, connecting shaft 4, gear box $3_2$, clutches $2_2$ and rolls $2_2$. In case the rear wheels are driving wheels, the front wheels are caused to be rotated via a route which is opposite to the above-described one.

The rolls $1_1$, $1_1$ for the front wheels are mounted on a stationary table 5 and the rolls $1_2$, $1_2$ for the rear wheels are mounted on a sliding table 6 which is slidably movable back and forth. The rear portion of the connecting shaft 4 is made in a telescopic construction comprising a sleeve 4a and a spline shaft 4b which is fitted into the sleeve 4a. Therefore, the distance between the rolls $1_1$ for the front wheels and the rolls $1_2$ for the rear wheels is arranged to be adjustable depending on the wheel base.

Each of the above-described rolls $1_1$, $1_2$ is made up of a pair of front and rear split rolls 1a, 1b which are connected via a belt 7 so as to be rotatable synchronously. A flywheel 8 is connected to the rear-side split roll 1b of the respective rolls $1_1$, $1_2$, and a detecting means 9 having a tachometer and a torquemeter is respectively disposed between the split roll 1b and the flywheel 8. Signals from the detecting means 9 are input to a monitor apparatus 10 comprising a microcomputer so that various inspections as described hereinbelow can be carried out.

Further, there are provided braking means $11_1$, $11_2$ to at least one of the pair of rolls $1_1$, $1_1$ for the front wheels and to at least one of the pair of rolls $1_2$, $1_2$ for the rear wheels. Each of the braking means $11_1$, $11_2$ comprises a brake to apply a braking force to the respective flywheel 8.

Explanations are made hereinbelow about the inspection of the traction control system and the inspection of the limited slip differential mechanism by means of the above-described inspecting apparatus. The motorcar to be used in this inspection is defined to be of a front drive.

(I) Inspection of Traction Control System

The accelerator pedal of the motorcar is depressed by an operator in a condition in which each of the wheels of the motorcar is mounted on each of the rolls $1_1$, $1_2$ and in which each of the clutches $2_1$, $2_2$ is engaged, to thereby cause the motorcar to run on the rolls. In this case, the rotation of the front wheels as the driving wheels is transmitted from the rolls $1_1$ to the rolls $1_2$ via the above-described route. The rear wheels as the driven wheels, therefore, synchronously rotate in the same rotational speed as the front wheels.

When the rolls $1_1$, $1_2$ have reached a predetermined speed $V_s$, the clutches $2_1$ for the rolls $1_1$ for the front wheels are disengaged to make the rolls $1_1$ for the front wheels and the rolls $1_2$ for the rear wheels rotate independent of each other. Also, the braking means $11_2$ for the rolls $1_2$ for the rear wheels are operated to decelerate the rolls $1_2$ for the rear wheels as represented by curve "a" in FIG. 2. According to this operation, a difference in rotational speed is generated between the front wheels and the rear wheels and consequently the traction control system is operated. The output of the engine is therefore controlled such that the ratio of slippage $\lambda=(V_1-V_2)/V_1$ to be obtained by the rotational speed $V_1$ of the front wheels and the rotational speed $V_2$ of the rear wheels is maintained at a predetermined set value $\lambda 1$. If the degree of acceleration to reach the predetermined speed Vs is gradual as shown by curve "b" in FIG. 2, the front wheels or, in other words, the rolls $1_1$ for the front wheels are decelerated as shown by curve "c" in FIG. 2 in a predetermined correlation to the deceleration of the rolls $1_2$ for the rear wheels such that the relationship between the rotational speed $V_1$ of the rolls for the front wheels and the rotational speed $V_2$ of the rolls $1_2$ for the rear wheels becomes $V_1=V_2/(1-\lambda 1)$.

Figure 2:
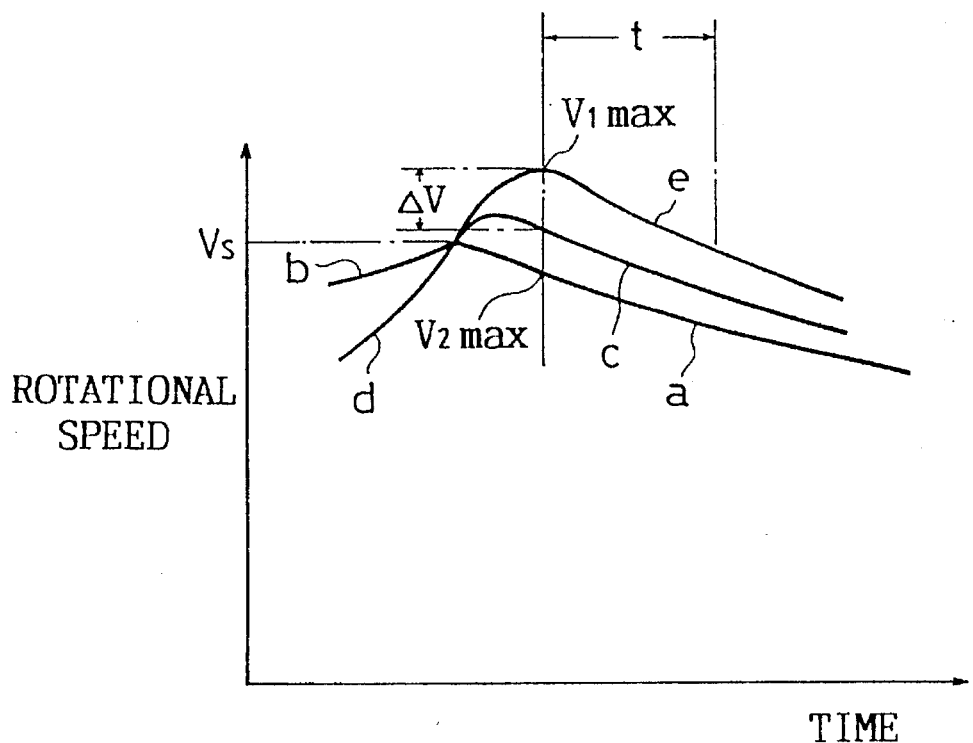
FIG. 2 is a diagram showing changes in rotational speed of wheels by the traction control system.

However, if the accelerator pedal is depressed strongly and consequently the degree of acceleration becomes steep as shown in curve "d" in FIG. 2, it takes time for the rolls $1_1$ for the front wheels to be decelerated even if the traction control system operates normally as the result of deceleration of the rolls $1_2$ for the rear wheels. Consequently, the rotational speed of the rolls $1_1$ for the front wheels will be largely overshot as shown by curve "e" in FIG. 2, and it takes time before the rolls $1_1$ for the front wheels are decelerated to the rotational speed which meets the above-described formula.

Here, in order to improve the efficiency by shortening the time required for the inspection, it is preferable to make it possible to judge whether the traction control system is acceptable or not by data sampling at a relatively short period of time after the rotational speed of the rolls $1_1$ for the front wheels has reached the maximum point of overshooting. It is not normally allowable, due to limited time available, to wait until the rolls $1_1$ for the front wheels are decelerated to a speed which meets the above-described formula.

Therefore, according to an embodiment of the present invention, an arrangement has been made so that a judgement can be made whether the traction control system is acceptable or not without being influenced by the overshooting of the rotational speed of the rolls $1_1$ for the front wheels. Namely, the arrangement is that the maximum speed $V_1$max of the rolls $1_1$ for the front wheels during deceleration of the rolls $1_2$ for the rear wheels is detected so that a standard value or a reference value for judging the acceptability or unacceptability of the traction control system can be corrected.

In more detail, the value $V_1$ to meet the above-described formula is set as a standard value. An amount of deviation $\Delta V$ off the standard value due to the overshooting is obtained by the following formula based on the maximum speed $V_1$max of the rolls $1_1$ for the front wheels and the speed $V_2$max of the rolls $1_2$ for the rear wheels detected at the time when the speed of the rolls $1_1$ reaches $V_1$max.

$$\Delta V=V_1\text{max}-\{V_2\text{max}/(1-\lambda 1)\}$$

Let an allowable error be defined to be A (0<A<1), and the upper limit VU and the lower limit VL of the standard for judgement are set to be as follows.

$$VU=\Delta V+\{(1+A)V_2/(1-\lambda 1)\}$$

$$VL=\Delta V+\{(1-A)V_2/(1-\lambda 1)\}$$

A judgement of acceptability or unacceptability is thus made by whether or not the rotational speed $V_1$ within a predetermined measuring time t from the time when the rotational speed $V_1$ of the rolls $1_1$ for the front wheels has reached $V_1$max lies within a standard range or a reference range between VL and VH.

When an acceleration is made on a bad road such as a gravel road or the like, there is a tendency that the acceleration force becomes stronger if an appropriate racing of the driving wheels takes place. When the rotational speed of the driven wheels has shown changes in vibrations which are peculiar to the bad road, there is sometimes a case where the set value of the ratio of slippage $\lambda$ is changed from the above-described value $\lambda 1$ to a value $\lambda 2$ which is larger than the value $\lambda 1$ to thereby carry out a bad road traction control in which the engine output control is relaxed to improve the acceleration efficiency.

Figure 3:
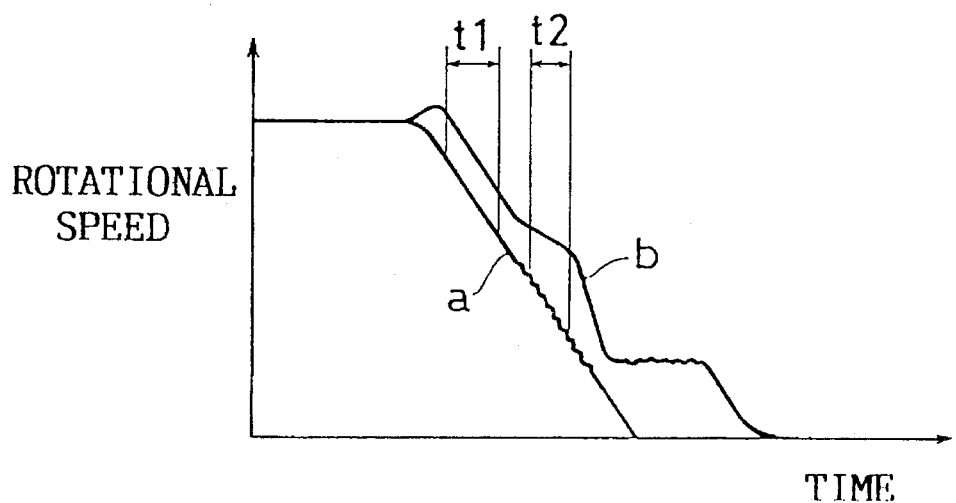
FIG. 3 is a diagram showing changes in rotational speed of wheels by the bad road traction control system.

In a motorcar in which this kind of bad road traction control is carried out, if the braking means $11_2$ is intermittently operated during deceleration of the rolls $1_2$ for the rear wheels to thereby generate rotational vibrations to the rolls $1_2$ for the rear wheels as shown by a curve "a" in FIG. 3, the degree of deceleration of the rolls $1_1$ for the front wheels is relaxed with a resultant increase in the ratio of slippage $\lambda$ as shown by a curve "b" in FIG. 3. A judgement is then made as to whether the ordinary traction control system is acceptable or not by whether or not the ratio of slippage $\lambda$ within a predetermined inspection time t1 prior to the generation of the rotational vibrations of the rolls $1_2$ for the rear wheels falls within a first allowable range which is based on a first set value $\lambda 1$. Also a judgement is made as to whether the bad road traction control system is acceptable or not by whether or not the ratio of slippage $\lambda$ within a predetermined inspection time t2 during generation of the rotational vibrations has increased to a value within a second allowable value which is based on the second set value $\lambda 2$.

(II) Inspection of Limited Slip Differential Mechanism

When an inspection is made of a limited slip differential mechanism which is incorporated into a differential gear between the right and left front wheels as the driving wheels, the motorcar is caused to run on the rolls as described above. When the rotational speed of the rolls $1_1$, $1_1$ for right and left front wheels has reached a predetermined speed, the clutches $2_1$, $2_1$ for the rolls $1_1$, $1_1$ are disengaged, and one $1_1$ of the rolls for the front wheels is braked by the braking means $11_1$.

At this time, there is generated a limited slip differential torque which corresponds to the difference in rotational speed between the right and left front wheels through the operation of the limited slip differential mechanism. The engine torque is evenly distributed to the right and left front wheels by means of the differential gear. Let the distributed torque be called T and the limited slip differential torque Ts. Then, a torque T+Ts will be transmitted to the front wheel of lower rotational speed on one $1_1$ of the rolls that is braked, and a torque T−Ts will be transmitted to the front wheel of higher rotational speed on the other $1_1$ of the rolls. The value Ts can be obtained by deducting the torque of the front wheel of the higher rotational speed from the torque of the front wheel of the lower rotational speed. The torque of the front wheel of the lower rotational speed can be measured as the torque which acts on the above-described one $1_1$ of the rolls on which the front wheel of the lower rotational speed is mounted. The torque of the front wheel of the higher rotational speed can be obtained by multiplying the acceleration of tile above-described other $1_1$ of the rolls on which the above-described front wheel of the higher rotational speed is mounted, by the moment of inertia of the front wheel of the higher rotational speed inclusive of the above-described roll $1_1$. Then, the difference in rotational speed between the rolls $1_1$, $1_1$ for the right and left front wheels is measured, and also the limited slip differential torque actually generated is calculated by measuring the torque which acts on the one $1_1$ of the rolls to be braked and the acceleration of the other $1_1$ of the rolls. It is thus judged whether the limited slip differential mechanism is acceptable or not by comparing a standard value of the limited slip differential torque which is generated at the measured difference in rotational speed and the actual limited slip differential torque.

In the above-described embodiment, it is so arranged that, in the inspection of the traction control system, the rolls $1_2$ for the rear wheels as the driven wheels are forcibly decelerated by means of the braking means $11_2$. However, the following arrangement may also be employed. Namely, the clutches $2_1$ for the rolls $1_1$ for the front wheels and/or the clutches $2_2$ for the rolls for the rear wheels are disengaged so that the rolls $1_2$ for the rear wheels are naturally decelerated without operating the braking means $11_2$.

Figure 4:
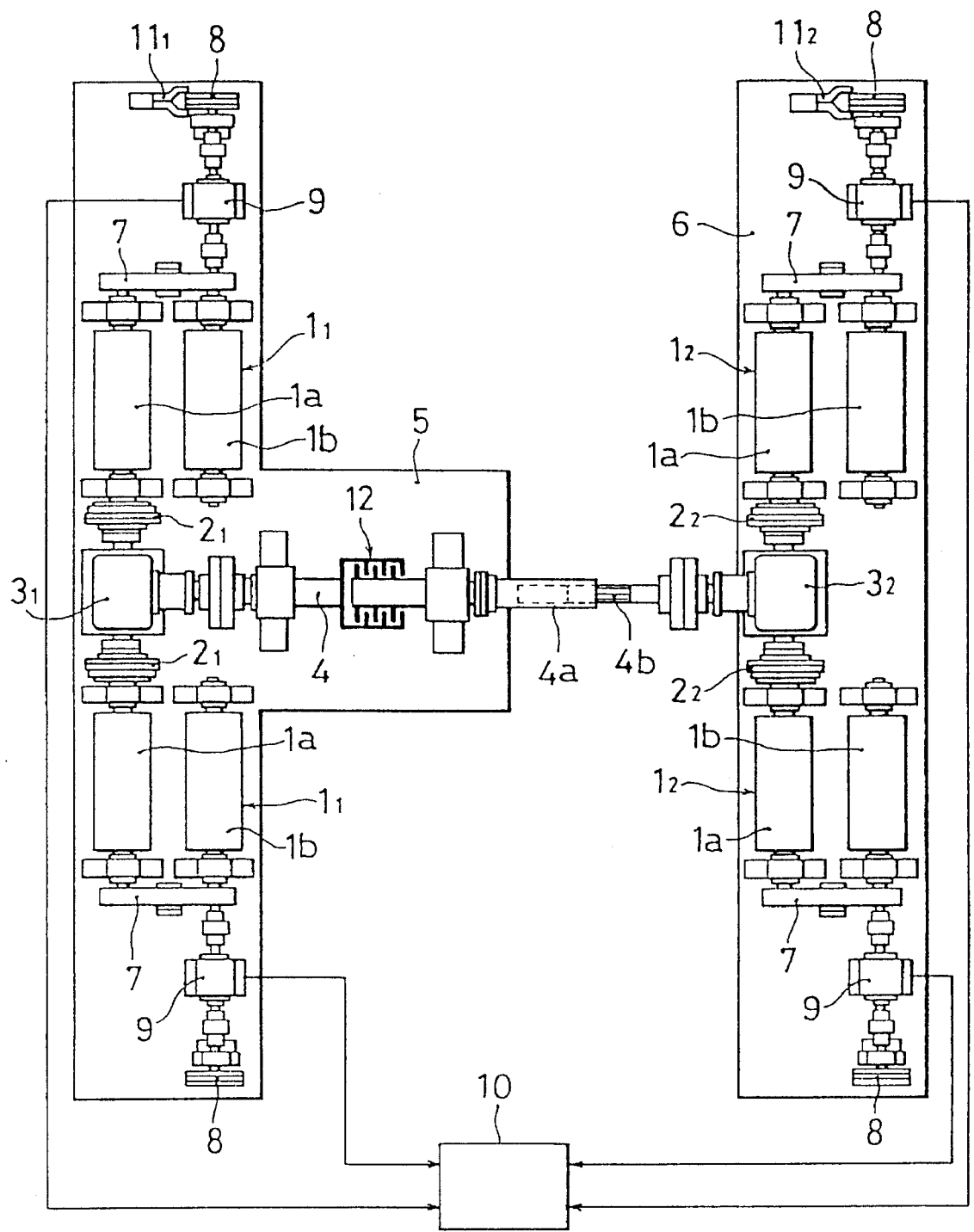
FIG. 4 is a plan view of a second embodiment of the inspecting apparatus according to the present invention.

Furthermore, as shown in FIG. 4, the following arrangement is also possible. Namely, a viscous coupling 12 is interposed in the connecting shaft 4 between the rolls $1_1$ for the front wheels and the rolls $1_2$ for the rear wheels. At the time of inspecting the traction control system, the rolls $1_2$ for the rear wheels are decelerated by operating the braking means $11_2$ without disengaging the clutches $2_1$, $2_2$. According to this arrangement, when the operation of the braking means $11_2$ has been released after the inspection, the power is transmitted to the rolls $1_2$ for the rear wheels through the viscous coupling 12. The rolls $1_2$ for the rear wheels and the rear wheels mounted thereon are accelerated so as to attain the same rotational speed as the front wheels. It is therefore possible to carry out a re-inspection or the like of the traction control system in a continuous manner.

By the way, as one mode of traction control, there is known a steering stability control which improves the cornering performance. This control operates as follows. Namely, an actual yawing rate (speed of turning round in motorcar body direction) at the time of cornering (or turning) is calculated based on the difference in rotational speed between the right and left driven wheels. A target yaw rate which is intended by the driver is calculated based on a steering angle of a steering wheel and the speed of the motorcar. When the difference between the target yaw rate and the actual yaw rate is large, i.e., when the motorcar body direction will not cleavage contrary to the driver's intention, the allowable ratio of slippage is restricted. Thus, the ratio of slippage of the driving wheels is restrained small to facilitate the generation of lateral forces of tires.

Further, in a 4-wheel-drive motorcar, there is also known, as disclosed in Japanese Published Unexamined Patent Applications Nos. 182128/1989 and 233124/1989, to carry out the rear wheel acceleration control in which the engine torque is distributed to the right and left rear wheels via a motorcar-mounted controller to accelerate the outer rear wheel at the time of cornering, thereby improving the cornering performance.

The inspection of the steering-interrelated control functions (i.e., control functions which are interrelated with the steering operation) which function to control the rotation of wheels according to the steering operation, such as the above-described steering stability control and the rear wheel acceleration control, is conventionally carried out by checking the cornering performance in actually driving a motorcar in a test course. It is, however, difficult to carry out the inspection of all of the completed motorcars. Since the inspection of all the products must still be carried out, there is another disadvantage in that the inspection is time-consuming and that a skill is required on the part of the worker to carry out the inspection.

As a solution, as shown by imaginary lines in FIG. 1, there is provided in the inspection apparatus a coupler 17 for inputting to the motorcar-mounted controller a pseudo steering signal which corresponds to the steering operation. It is thus so arranged that the inspection of the steering-interrelated control functions can be carried out by simulating the steering wheel operating conditions through the pseudo signal while running the motorcar on the inspecting apparatus.

Figure 5:
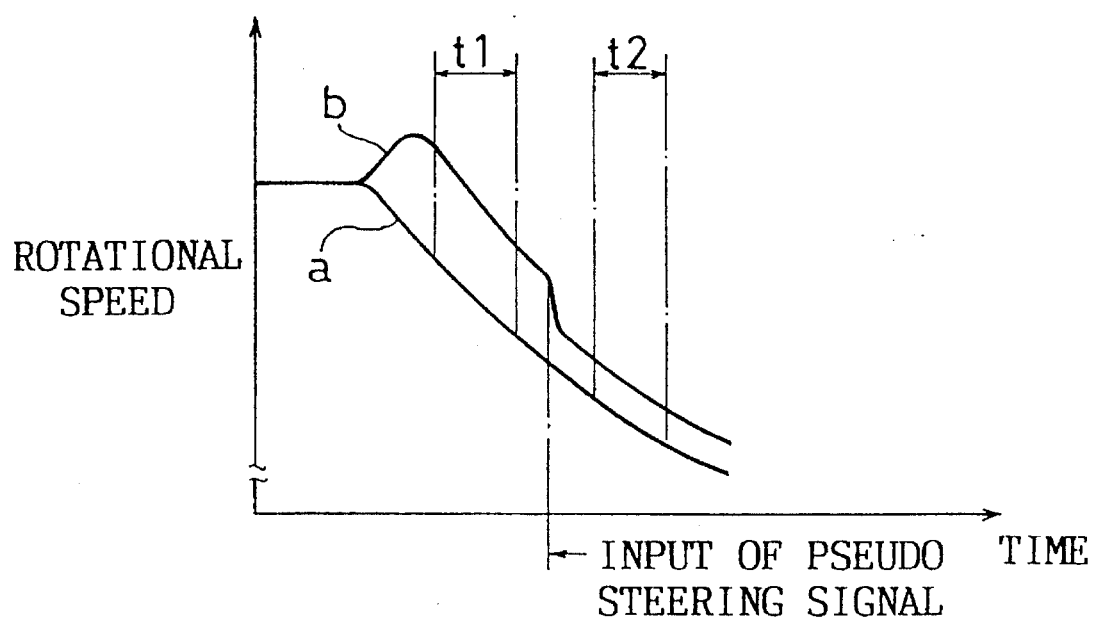
FIG. 5 is a diagram showing changes in rotational speed of the steering stability control system.

In more detail, when the inspection of the steering stability control which is included in the traction control system is carried out, the rolls $1_2$ for the rear wheels as the driven wheels are decelerated as shown by curve "a" in FIG. 5 in a similar manner as in the above-described embodiment. A pseudo steering signal is input to the motorcar-mounted controller via the coupler 17 during the deceleration.

In this case, since the rotational speeds of the right and left rear wheels are equal, the motorcar-mounted controller judges that there is a large difference between the target yaw rate and the actual yaw rate, the former being calculated by the steering angle to be given by the pseudo steering signal and the motorcar speed, and the latter being calculated by the difference in rotational speed between the right and left rear wheels. As a consequence, the steering stability control function is operated to control the rotation of the front wheels as the driving wheels as shown by curve "b" in FIG. 5 such that the ratio of slippage $\lambda$ falls below $\lambda 3$ which is smaller than the above-described predetermined set value $\lambda 1$. As a result, the difference in rotational speed between the front wheels and the rear wheels is decreased.

Then, in the monitor apparatus 10, the ratio of slippage $\lambda$ is calculated based on the rotational speed signals from the detecting means 9 for each of the rolls $1_1$, $1_2$. A judgement is made as to whether the normal control of the traction control system is acceptable or not by checking whether or not the ratio of slippage $\lambda$ at a predetermined inspection time t1 prior to inputting the pseudo steering signal falls within an allowable range which is based on $\lambda 1$. Thereafter, a judgement is made as to whether the steering stability control is acceptable or not by checking whether the ratio of slippage $\lambda$ at a predetermined inspection time t2 at the time of inputting the pseudo steering signal has decreased to a value within an allowable range which is based on $\lambda 3$.

The above-described inspecting apparatus can also be used for inspecting the accelerating function of the outer rear wheel at the time of cornering of a 4-wheel-drive motorcar which is provided with a torque distribution apparatus for the rear wheels. The inspecting procedures thereof are explained hereinbelow.

Each of the wheels is mounted on each of the rolls $1_1$, $1_2$. The motorcar-mounted controller for the torque distribution apparatus is connected to the coupler 12. The motorcar is caused to run in a condition in which all the clutches $2_1$, $2_2$ are disengaged so that each of the rolls $1_1$, $1_2$ can be rotated independently. During this running, a pseudo steering signal which indicates steering of the steering wheel by a predetermined angle to the right or to the left, are input to the motorcar-mounted controller via the coupler 12.

Figure 6:
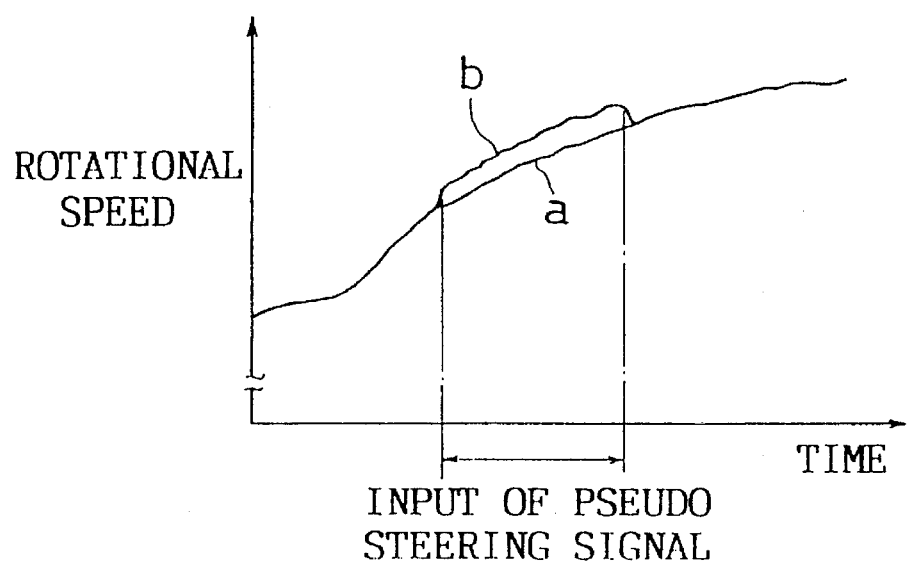
FIG. 6 is a diagram showing changes in rotational speed of the rear wheel accelerating function of a 4-wheel-drive motorcar.

In this case, if the rear wheel acceleration function operates normally and if the pseudo steering signal is for the right turn signal, the rotational speed (curve "b" in FIG. 6) of the left rear wheel which corresponds to the outer rear wheel at the time of cornering is accelerated by a predetermined rate relative to the rotational speed (curve "a" in FIG. 6) of the other wheel.

In the monitor apparatus 10, the rate of acceleration of the roll for mounting thereon the outer rear wheel relative to the other roll is calculated. It is thus judged whether the rear wheel accelerating function is acceptable or not by whether or not the accelerating rate at the time of inputting the pseudo steering signal lies within a predetermined allowable range.

Figure 7:
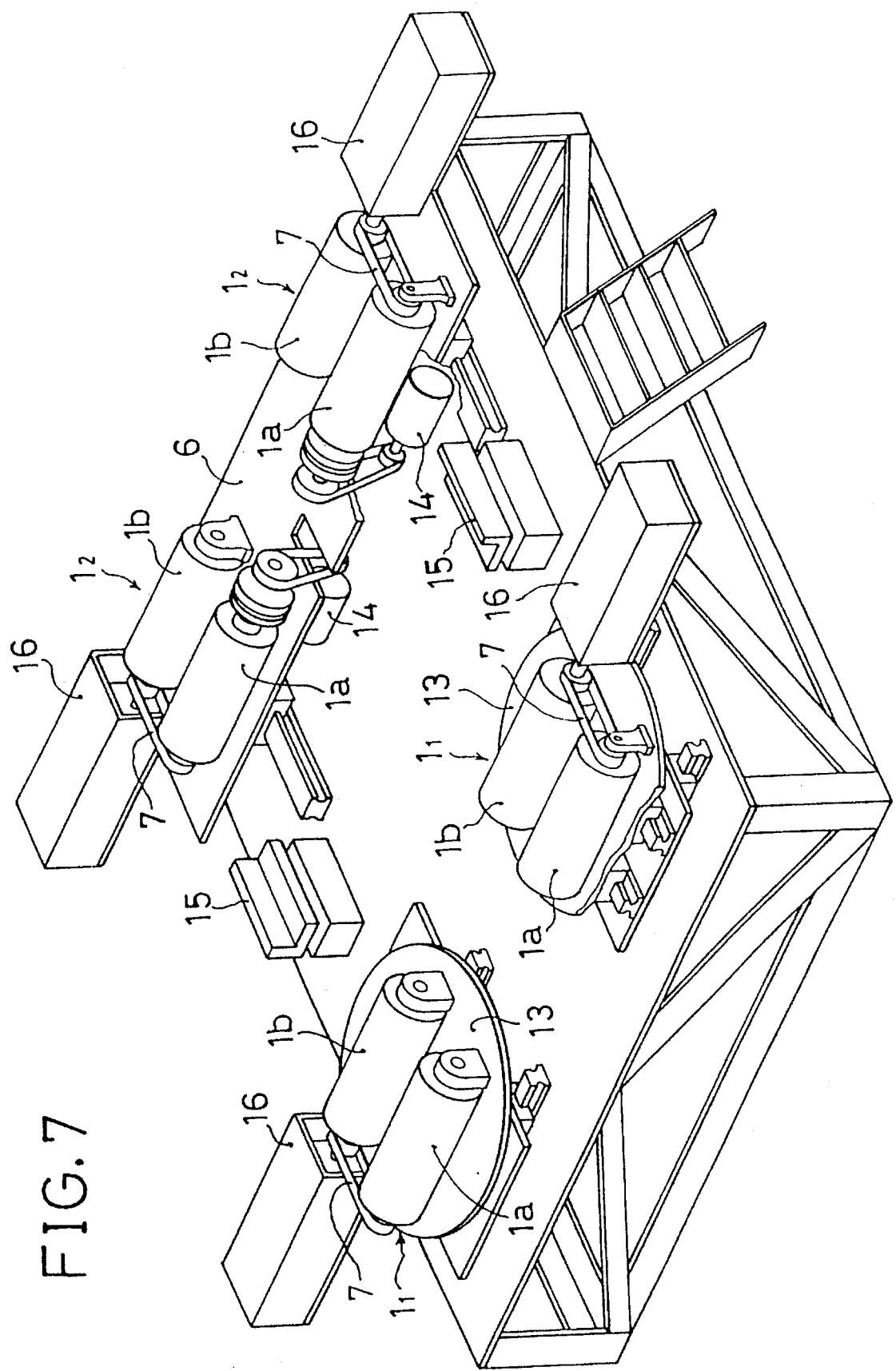
FIG. 7 is a perspective view of a third embodiment of the inspecting apparatus according to the present invention.

FIG. 7 shows another embodiment of the inspecting apparatus. In this apparatus, each of the rolls $1_1$ for the front wheels is mounted on a turn table 13 which is rotatable about a vertical axis and which is movable both back and forth and right and left. It is thus so arranged that the front wheels can actually be steered by steering the steering wheel of the motorcar.

Each of the rolls $1_2$, $1_2$ for the rear wheels is mounted on a slidable table 6 like in the above-described embodiment. However, since the rolls $1_1$ for the front wheels are mounted on the turn table 13, it is difficult to connect the rolls $1_1$ for the front wheels and the rolls $1_2$ for the rear wheels via a connecting shaft 4 like in the above-described embodiment. Therefore, the rolls $1_2$ for the rear wheels are arranged to be rotated by respective electric motors 14. Furthermore, in this embodiment, engaging members 15 which are movable up and down are provided in a pair on the right and left sides. At the time of inspection, these engaging members 15 are lifted to engage them with a suitable portion, e.g., side sills, of the motorcar body so that the lateral movement of the motorcar at the time of steering can be restricted. In FIG. 7, numerals 16 denote covers for covering those portions in which the flywheel and the detecting means are positioned.

In carrying out the inspection of the traction control system, the motorcar is caused to run in a condition in which each of the wheels is mounted on each of the rolls $1_1$, $1_2$. The rear wheels as the driven wheels are rotated by the electric motors 14 via the rolls $1_2$ for the rear wheels at the same rotational speed as the front wheels. When a predetermined rotational speed has been reached, the electric motors 13 or, in other words, the rear wheels are decelerated. Further, the steering operating conditions are simulated by actually steering the steering wheel so that the steering stability control function can operate. In this case, it is also possible to generate a difference in rotational speed between the right and left rear wheels to inspect whether or not the ratio of slippage varies according to the changes in the difference in the rotational speed.

Furthermore, in carrying out the inspection of the rear wheel acceleration function of the 4-wheel-drive motorcar, the motorcar is caused to run in a condition in which each of the electric motors 14 is stopped. During this running, the steering operating conditions are simulated by actually steering the steering wheel so that the rear wheel acceleration function can operate.

By the way, if the rolls $1_1$ for the front wheels are mounted on the turn table 13 like in this embodiment, the construction of the inspecting apparatus becomes complicated. The construction of the inspecting apparatus can be made simpler if the steering operating conditions are simulated by the pseudo steering signal as in the abovedescribed embodiment. In addition, fluctuations in the steering operating conditions are prevented and, consequently, the inspection accuracy can be improved.

The steering-interrelated control functions can also be operated in the following manner. Namely, an inspecting program for carrying out the steering-interrelated functions by inputting a trigger signal is stored in the motorcar-mounted controller, and the trigger signal for the inspecting program is input as the pseudo steering signal.

It is readily apparent that the above-described method of inspecting a plurality of control functions of a motorcar as well as the apparatus for carrying out the method meet all of the objects mentioned above and also have the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method of inspecting a steering-interrelated control function of a motorcar which operates to control a rotation of at least one wheel in response to a steering operation of the motorcar, said method comprising the steps of:

providing an inspecting apparatus having rolls for mounting thereon wheels of the motor cars;

running the motorcar in a condition in which each of the rolls provided in the inspecting apparatus has one of the wheels mounted thereon;

simulating steering wheel operating conditions during the preceding step of running;

detecting a change in rotational speed of a first of said rolls having mounted thereon a controlled wheel which is subject to the control of said steering-interrelated control function and a change in rotational speed of a second of said rolls having mounted thereon another wheel which is counterpart and which is not subject to the control of said steering-interrelated function; and judging whether the steering-interrelated control function is acceptable or not based on a correlation of said changes in rotational speed of said first and second rolls.

2. A method of inspecting a steering-interrelated control function of a motorcar according to claim 1, wherein said step of simulating the steering wheel operating conditions is carried out by inputting to a motorcar-mounted controller a pseudo steering signal which corresponds to the steering operation.

3. An apparatus for inspecting a steering-interrelated control function of a motorcar, said apparatus having rolls for mounting thereon respective wheels of the motorcar to carry out an inspection of the steering-interrelated control function by running the motorcar in a condition in which each of said rolls has one of said wheels mounted thereon, said apparatus comprising:

first detecting means for detecting a change in rotational speed of a first roll having mounted thereon a controlled wheel which is subject to the control of said steering-interrelated control function;

second detecting means for detecting a change in rotational speed of a second roll having mounted thereon another wheel which is counterpart and which is not subject to the control of said steering-interrelated control function;

inputting means for inputting to a motorcar-mounted controller a pseudo steering signal which corresponds to the steering operation; and judging means for judging whether the steering-interrelated control function is acceptable or not based on a correlation of said changes in rotational speed of both said rolls.

* * * * *

UNITED STATES PATENT AND TRADEMARK OFFICE
CERTIFICATE OF CORRECTION

PATENT NO.:   5,483,823
DATED    :   January 16, 1996
INVENTOR(S):   SHIBAYAMA et al.

It is certified that error appears in the above-identified patent and that said Letters Patent is hereby corrected as shown below:

Column 10, claim 1, line 6, "motor cars" should read --motorcar--.

Signed and Sealed this

Thirtieth Day of July, 1996

Attest:

BRUCE LEHMAN

*Attesting Officer*            *Commissioner of Patents and Trademarks*